(12) United States Patent
Gillespie et al.

(10) Patent No.: US 6,561,082 B2
(45) Date of Patent: May 13, 2003

(54) QUICK ASSEMBLY BARBECUE GRILL AND CART ASSEMBLY

(75) Inventors: Bradley R. Gillespie, Columbus, GA (US); Otha Richardson, Columbus, GA (US)

(73) Assignee: W. C. Bradley Company, Columbus, GA (US)

( * ) Notice: Subject to any disclaimer, the term of this patent is extended or adjusted under 35 U.S.C. 154(b) by 0 days.

(21) Appl. No.: 10/161,777

(22) Filed: Jun. 4, 2002

(65) Prior Publication Data

US 2003/0029324 A1 Feb. 13, 2003

Related U.S. Application Data

(63) Continuation-in-part of application No. 09/927,107, filed on Aug. 10, 2001, now Pat. No. 6,397,731.

(51) Int. Cl.⁷ .......................... A47J 37/00; A47J 37/04; A47J 37/07; F24C 3/00; F24C 3/04
(52) U.S. Cl. .......................... 99/339; 99/340; 99/449; 99/450; 99/482
(58) Field of Search ................. 99/331–333, 339, 99/340, 400, 401, 444–450, 481, 482; 126/25 R, 9 R, 41 R; 426/465, 523, 314, 345

(56) References Cited

U.S. PATENT DOCUMENTS

| 4,166,413 A | * | 9/1979 | Meszaros ...................... 99/393 |
| 4,718,399 A | * | 1/1988 | Shepherd .................. 99/450 X |
| 5,109,834 A | * | 5/1992 | Collins et al. ............. 99/450 X |
| 5,452,707 A | * | 9/1995 | Harris et al. .............. 99/482 X |
| 5,623,866 A | * | 4/1997 | Home ......................... 99/444 |
| 6,397,731 B1 | * | 6/2002 | Gillespie et al. .............. 99/339 |

\* cited by examiner

*Primary Examiner*—Timothy F. Simone
(74) *Attorney, Agent, or Firm*—James W. Kayden; Thomas, Kayden, Horstemeyer & Risley, LLP

(57) ABSTRACT

A barbecue grill cart including a right leg frame assembly and a left leg frame assembly, each having a front leg and a rear leg, the front leg and the rear legs being connected by a support member. The cart further includes a front panel and securing means, the securing means being disposed through the front panel and the right front leg and the left front leg.

6 Claims, 4 Drawing Sheets

QUICK ASSEMBLY BARBECUE GRILL AND CART ASSEMBLY

CROSS-REFERENCE TO RELATED APPLICATION

This application is a continuation-in-part of copending U.S. utility application entitled, "Quick Assembly Barbecue Grill Cart and Assembly," having Ser. No. 09/927,107, filed Aug. 10, 2001, now U.S. Pat. No. 6,397,731 which is entirely incorporated herein by reference.

FIELD OF THE INVENTION

The present invention is generally related to the field of barbecue grills, and more particularly to quick assembly grill carts requiring few or no tools for assembly.

BACKGROUND OF THE INVENTION

Commonly, barbecue grills are not assembled when they are purchased. This makes commercial sense in that each barbecue grill requires less space during shipping and storing, meaning more units may be transported in each shipment, thereby saving money for both the manufacturer and the retailer of the barbecue grill. In addition this provides for easier transportation of the barbecue grill from the store by the purchaser. However, this also results in a number of potential problems. The purchaser has to either partially or fully assemble the barbecue grill prior to use. This can require added expense and possibly significant time on the part of the purchaser. For example, should the purchaser not already possess the tools required to assemble the barbecue grill, the purchaser will have to either borrow or purchase them. As well, quite frequently, the assembly of the barbecue grill may be beyond the mechanical acumen of the purchaser, thereby causing frustration and reduced consumer satisfaction in the overall product.

Furthermore, assembly by the purchaser increases both the chances of parts being lost during assembly and the barbecue grill being improperly assembled. Lost parts can lead to time and effort on the part of both the purchaser and manufacturer. First, the purchaser must secure another part before assembly can be completed and the barbecue grill used. Hopefully, the missing part is in the retailer's stock system so that the part may be rapidly replaced. However, in all likelihood, the part will have to be procured from the manufacturer, leading to lengthy delays in the use of the barbecue grill. Second, because the grill is brand new, the purchaser will likely believe the missing part was not originally provided. Therefore, the manufacturer, in all likelihood, will have to replace the part free of charge. Worse yet, should the barbecue grill be assembled either without all the required parts, or just improperly, safety concerns arise, such as the barbecue grill being unstable; improper gas train assembly causing a fire hazard; etc.

Therefore, a need exists for a barbecue grill requiring few or no tools to assemble and including a minimal number of separate parts that require assembly.

SUMMARY OF THE INVENTION

Briefly described, the barbecue grill cart provides an easily and rapidly assembled support structure for barbecue grills. An embodiment of the barbecue grill cart includes a right leg frame assembly and a left leg frame assembly, each having a front leg and a rear leg, the front leg and the rear legs being connected by a support member. The cart further includes a front panel and securing means, the securing means being disposed through the front panel and the right front leg and the left front leg.

Other objects, features, and advantages of the present invention will become apparent to one with skill in the art upon examination of the following drawings and detailed description. It is intended that all such objects, features, and advantages be included herein within the scope of the present invention, as defined in the appended claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

Figure 1:
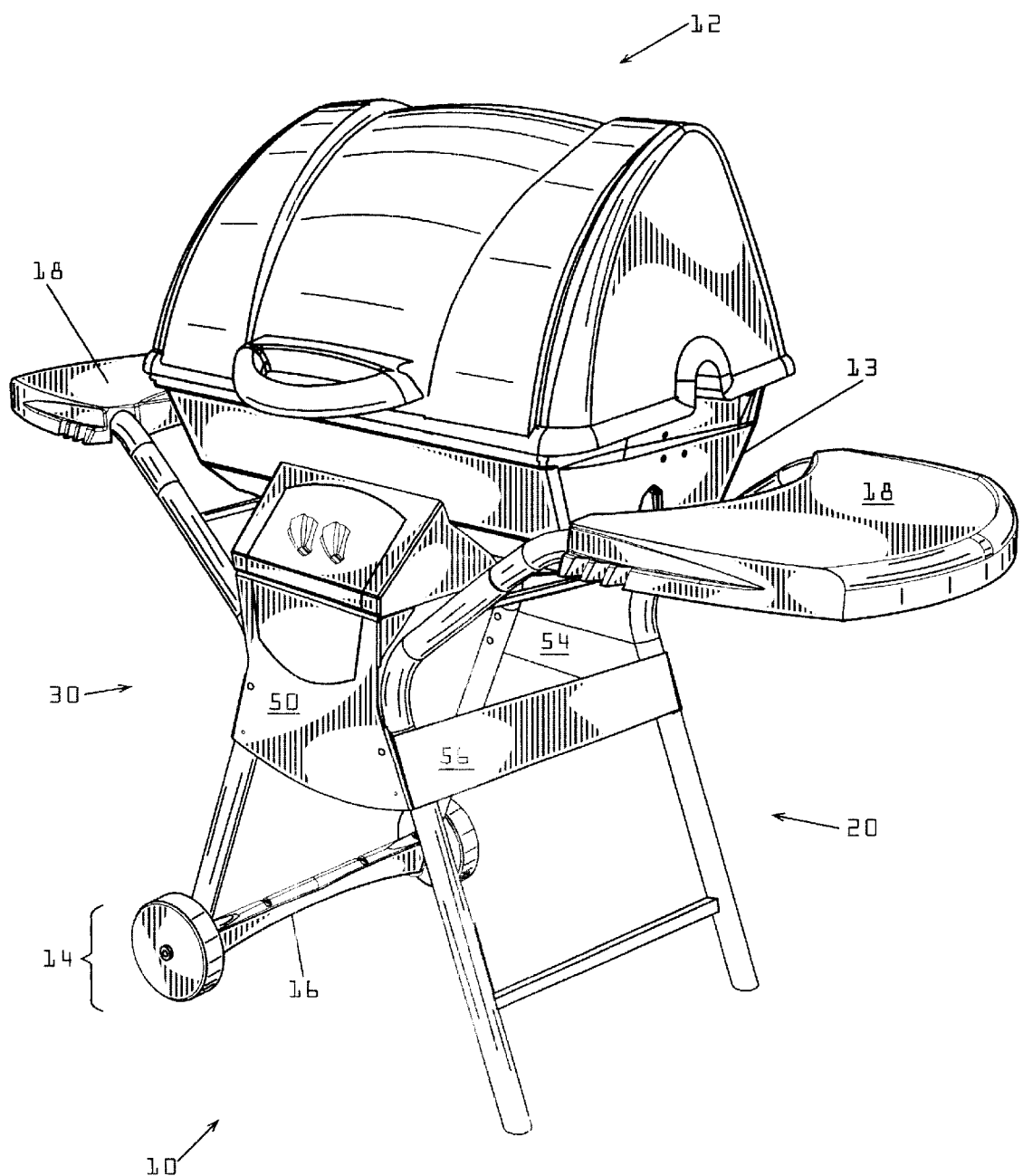
FIG. 1 is a perspective view of the present barbecue grill cart, shown here in completely assembled form with a barbecue grill supported thereby.

Reference will now be made in detail to the description of the barbecue grill cart as illustrated in the drawings. While the barbecue grill cart will be described in connection with these drawings, there is no intent to limit it to the embodiment or embodiments disclosed therein. On the contrary, the intent is to cover all alternatives, modifications and equivalents included within the spirit and scope of the barbecue grill cart as defined by the appended claims.

Figure 4:
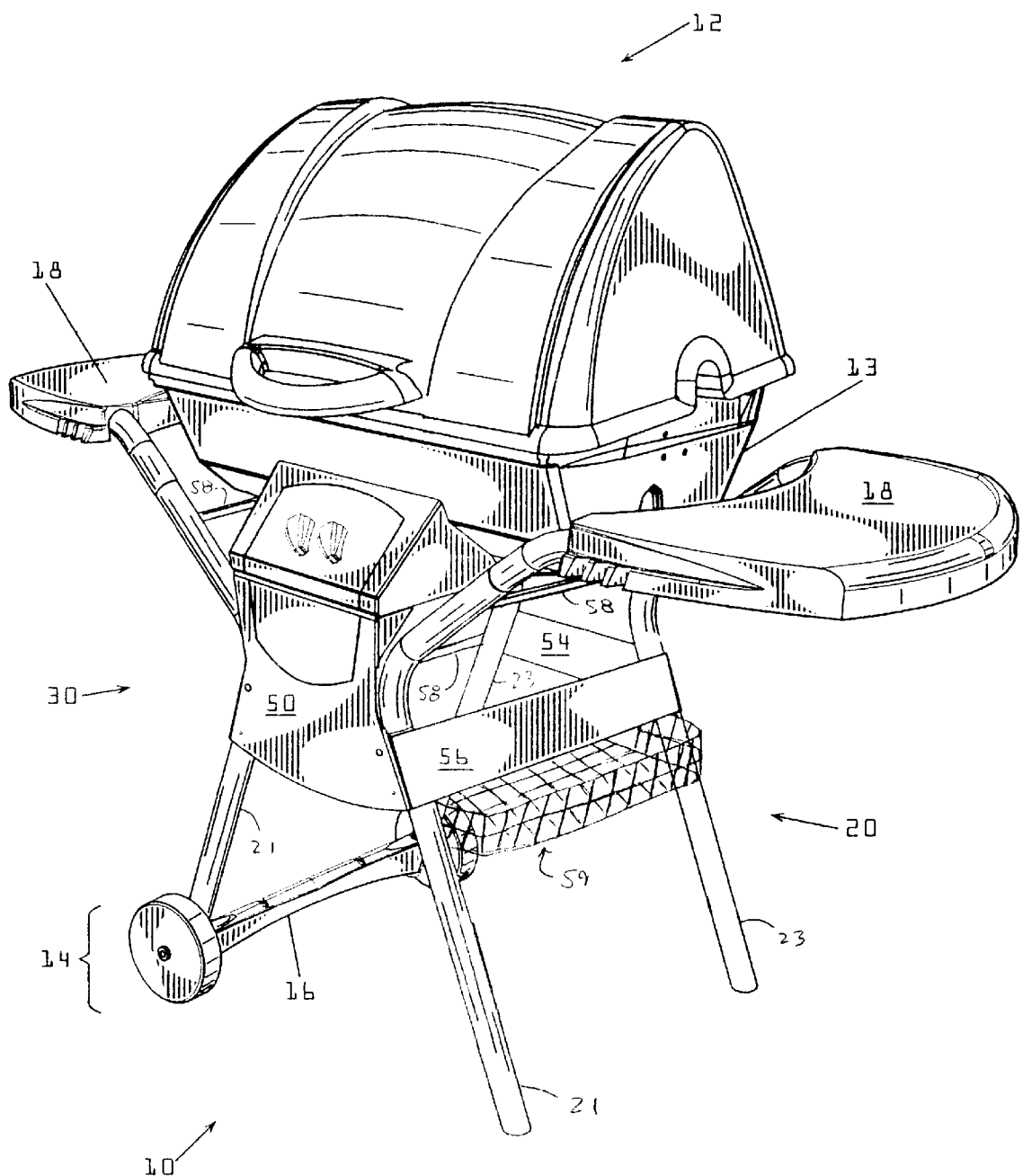

FIG. 4 is a perspective view of an alternative embodiment of the present barbecue grill cart, shown here in completed assembled form with a barbecue grill cart supported thereby.

DETAILED DESCRIPTION OF THE PREFERRED EMBODIMENT

Figure 3:
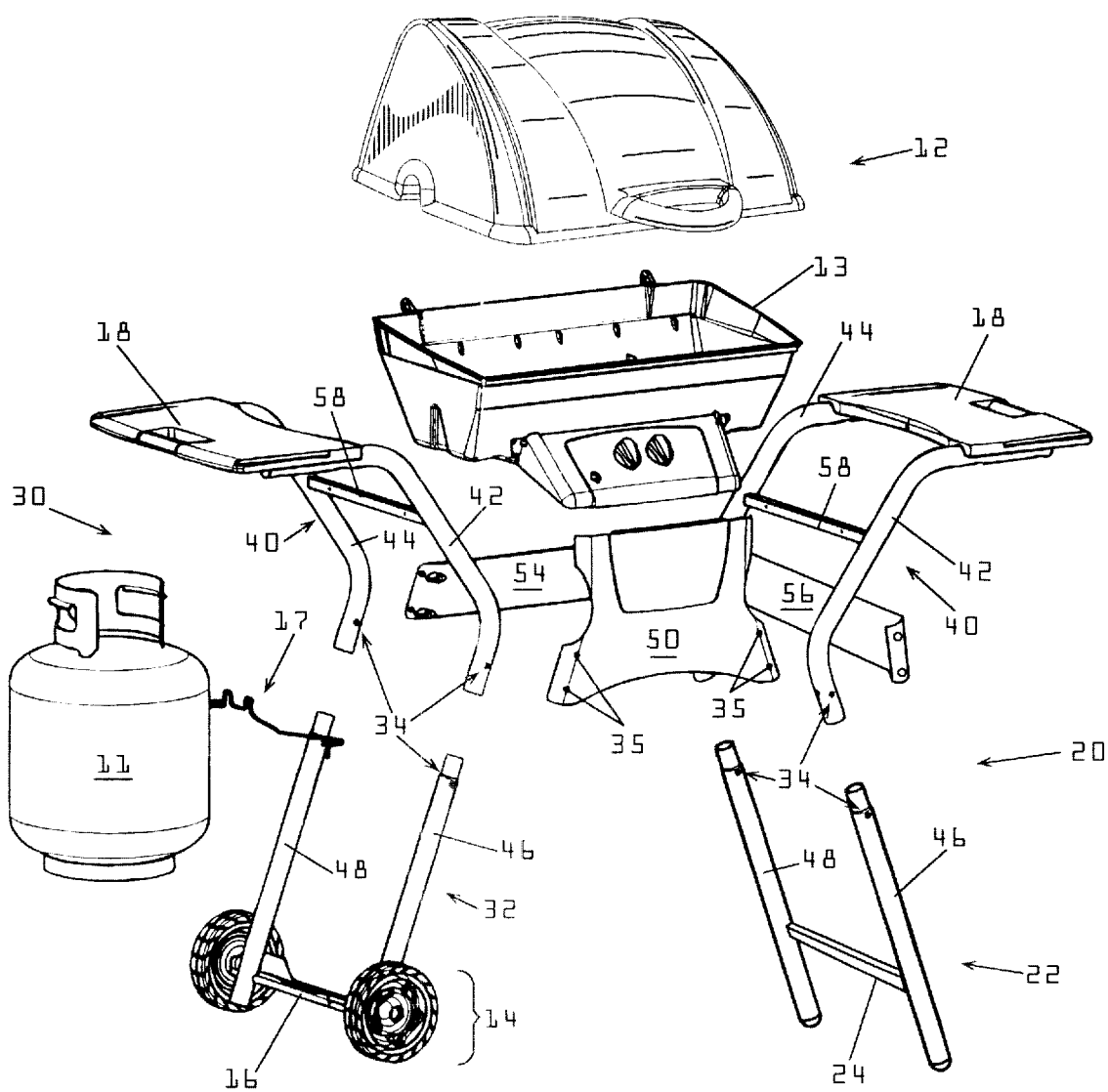
FIG. 3 is an exploded perspective view of the present barbecue grill cart.

Referring now more specifically to the drawings, and to FIGS. 1 and 3 in particular, numeral 10 designates generally the present barbecue grill cart, shown here supporting a barbecue grill 12. The major difference between the right leg frame assembly 20 and the left leg frame assembly 30 is the provision of a wheel assembly 14 on the left leg frame assembly 30, as well as the fact that the left leg frame assembly 30 is configured to support an LP gas tank 11. Note that the right leg frame assembly 20 can be similarly configured if desired.

The right and left leg frame assemblies 20, 30 further include upper frame assemblies 40, each including a front upper leg 42 and a rear upper leg 44 rigidly joined by a horizontal support member 58 configured to receive the barbecue grill 12. The right and left leg frame assemblies 20, 30 further include a right lower frame assembly 22 and a left lower frame assembly 32, respectively. Each lower frame assembly 22, 32 includes a front lower leg 46 and a rear lower leg 48. The front lower leg 46 and rear lower leg 48 of the right lower frame assembly 22 are rigidly connected with a lower horizontal member 24, while the front lower leg 46 and rear lower leg 48 of the left lower frame assembly 32 are connected by the above-mentioned wheel assembly 14. Note, alternative embodiments are envisioned wherein the right and left leg frame assemblies 20, 30 include front and rear legs of one piece construction.

Figure 2A:
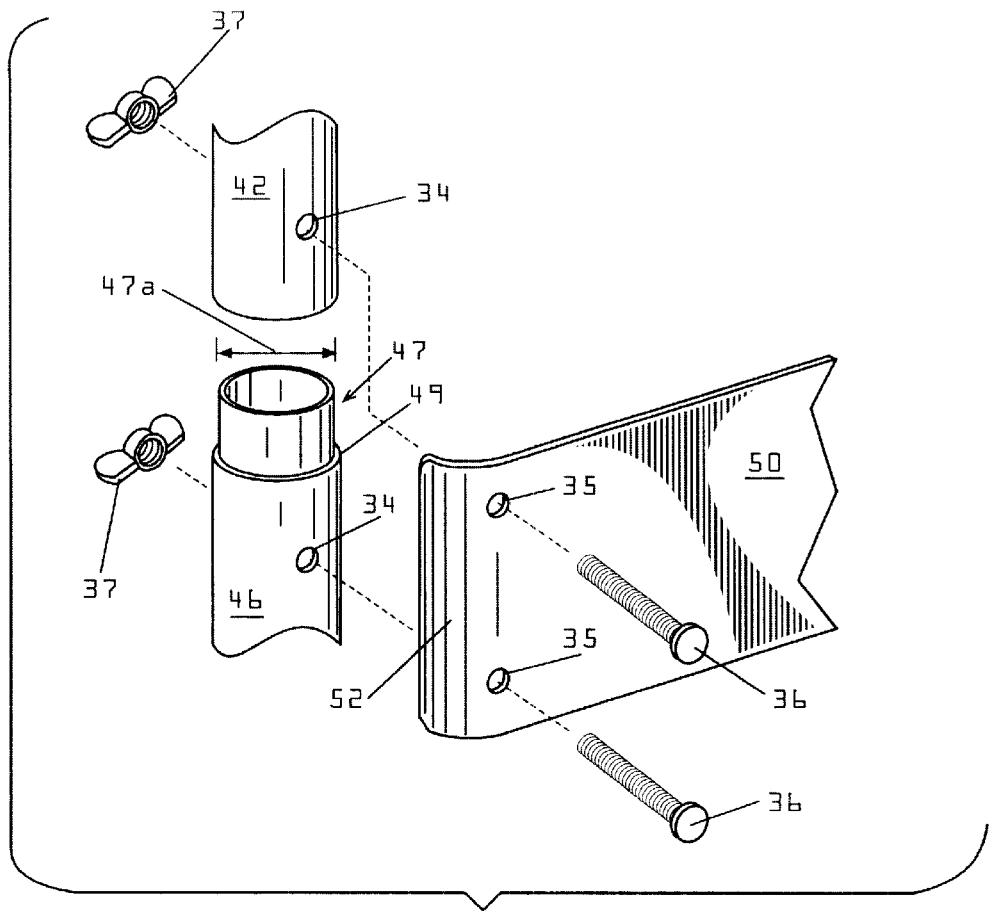
FIGS. 2A and 2B are partial, fragmentary, perspective views detailing a securing system for connection of the panels to the legs.

Referring now to FIG. 2A, the upper end of a front lower leg 46 and the lower end of a front upper leg 42 are shown along with the corresponding portion of the front panel 50. The front lower leg 46 shown includes an extension 47 and a lip 49. The outer diameter 47a of the extension measures less than the inner diameter (not shown) of the front upper leg 42, thereby allowing the front lower leg 46 to be inserted into the front upper leg 42. Note that the lip 49 limits the extent to which the front lower leg 46 is inserted into the front upper leg 42, thereby limiting the overlapping region (not shown) of the front upper 42 and front lower legs 46 to the length of the extension 47. The extension can also be placed on the front upper leg 42 rather than the front lower leg 46, thereby requiring insertion of the front upper leg 42 into the front lower leg 46 for assembly.

After the front upper leg 42 and front lower leg 46 have been telescopically connected, securing means are used in conjunction with panels to hold the front upper leg 42 and the front lower leg 46 together. Apertures 34 are provided, one each, in the front upper leg 42 and the front lower leg 46. The aperture 34 disposed in the front lower leg 46 is located below and adjacent the lip 49. The aperture 34 disposed in the front upper leg 42 is located above and adjacent the leading edge of the extension 47, after the extension has been inserted into the front upper leg 42. As such, there is an aperture 34 located above and below each of the overlapping regions. Panels are provided, each panel having flange means 52 at each end. Each flange means 52 is configured to fit over a portion of a corresponding leg that includes the apertures 34 disposed, in this case, the front upper leg 42 and the front lower leg 46. Further, each flange means 52 has corresponding apertures 35 aligned with the apertures 34 of the upper legs and lower legs. After the flange means 52 are positioned, securing means are passed through both the apertures 34 and corresponding apertures 35 of the flange means 52, thereby securing the front upper leg 42 and the front lower leg 46 together. The upper and lower legs of each leg on the grill cart 10 are similarly assembled.

Figure 2B:
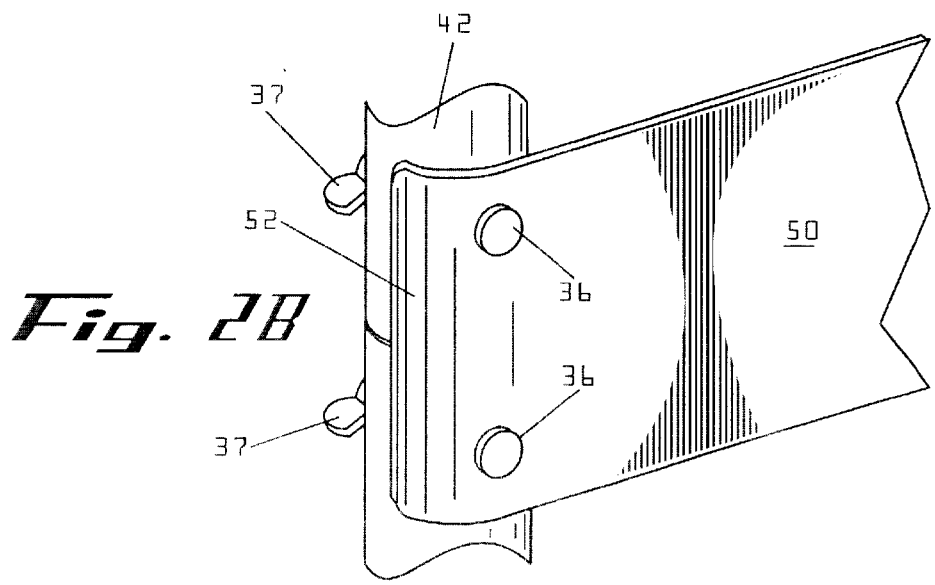

As shown in FIG. 1, a front panel 50 and a rear panel 54 are used to create a rigid barbecue grill cart 10 for receiving a barbecue grill 12. The front panel 50 and rear panel 54 not only connect the upper legs to the lower legs, they serve to connect the right leg frame assembly 20 to the left leg frame assembly 30. For added stability, a side panel 56 is provided opposite the leg frame assembly configured to support the LP gas tank 11 (FIG. 3). This side panel 56 is connected to its respective leg frame assembly using apertures 34 (FIGS. 2A and 2B) and the securing means that are used to connect the corresponding flange means of the front panel 50 and rear panel 54 to the respective leg frame assembly. In the embodiment shown, threaded bolts 36 with nuts configured to be hand tightened 37 are preferred. However, numerous securing means would suffice (i.e., longitudinal members with cotter keys, threaded bolts and nuts, etc.). Similar securing means can also be used to secure the bottom casting 13 of the barbecue grill 12 to the barbecue grill cart 10 by passing the threaded bolts 36 down through matching apertures (not shown) in both the bottom casting 13 and each of the horizontal support members 58. As such, no tools are required to assemble the barbecue grill cart 10, or attach a barbecue grill 12 thereto.

As previously noted, a wheel assembly 14 is provided that includes a strut member 16 extending along the longitudinal axis of the wheel assembly 14. The strut member 16 is configured to receive the bottom portion of a LP tank 11 (FIG. 3) and is rotatably secured about the longitudinal axis. This permits the strut member 16 to be rotated to one side to receive an LP tank 11 and then be rotated back such that the tank 11 is vertical. The tank 11 is further secured in place by a tank wire 17 that is attached to both legs of the corresponding leg frame assembly. Ideally, the tank wire 17 is configured such that the securing means used to attach the front panel 50 and rear panel 54 to the corresponding leg assembly can be used; however, additional apertures (not shown) can be provided in the legs for receiving the tank wire, as is known in the art.

For added convenience, side shelves 18 are provided. Ideally, the upper frame assemblies 40 of both the right and left leg frame assemblies 20, 30 include a side shelf 18.

FIG. 4 shows an alternative embodiment of the barbecue grill cart 10 of the present invention. More specifically, FIG. 4 shows an embodiment of the barbecue grill cart 10 wherein the front legs 21 and rear legs 23 are of unitary construction rather than telescopically joined. As shown, the right leg assembly 20 and left leg assembly 30 are each formed by securing their respective front and rear legs 21, 23 with a horizontal support member 58. The one-piece front and rear legs 23 offer the advantage of further reducing the number of individual parts, and subsequently reducing the amount of time and effort required to assemble the barbecue grill cart 10. Although only one horizontal support 58 is required to form each of the right and left leg assemblies 20, 30, additional supports may be added for stability.

Also, the wheel assembly 14 can include either a solid axle (not shown) disposed between the wheels or a pair of pins (not shown), each supporting a wheel on one end and an end of the strut member 16 on the other. For convenience, additional features may be added to the barbecue grill cart 10. For example, a basket 59 for holding cooking implements, spices, etc., is shown in FIG. 4. The basket 59 shown in FIG. 4 can be secured to either the side panel 56 or directly to the front and rear legs 21, 23 of the leg assembly, thereby also serving as a structural member.

The foregoing description has been presented for purposes of illustration and description. It is not intended to be exhaustive or to limit the invention to the precise forms disclosed. Obvious modifications or various are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A barbecue grill cart assembly, comprising:
   a right leg frame assembly including a right front leg and a right rear leg, said right front leg and said right rear leg being connected by a right support member;

a left leg frame assembly including a left front leg and a left rear leg, said left front leg and said left rear leg being connected by a left support member;

a front panel;

securing means; and wherein said securing means are disposed through said front panel and said right front leg and said left front leg below the level of said right and left support members.

2. The barbecue grill cart assembly of claim 1, further including a rear panel wherein said securing means are disposed through said rear panel and said right rear leg and said left rear leg.

3. The barbecue grill cart assembly of claim 2, further including a second left support member secured to said left front leg and said left rear leg, said second left support being disposed adjacent said front panel and said rear panel.

4. The barbecue grill cart assembly of claim 1, wherein said left lower frame assembly further includes a wheel assembly disposed at a bottom end.

5. A barbecue grill cart assembly for supporting a barbecue thereon comprising:

a right leg frame assembly including a right front leg and a right rear leg;

a left leg frame assembly including a left front leg and a left rear leg;

a front panel;

a rear panel;

a right support member connecting said right front leg and said right rear leg;

a left support member connecting said left front leg and said left rear leg; and wherein said front legs and said rear legs each include an aperture, said front panel includes corresponding apertures for mating with said apertures in said right and said left front legs, said rear panel includes corresponding apertures for mating with said apertures in said right and said left rear legs, and fastening means for securing said front panel to said right and said left front legs and said rear panel to said right and said left rear legs.

6. A barbecue grill and cart assembly comprising:

a right leg frame assembly including a right front leg and a right rear leg;

a left leg frame assembly including a left front leg and a left rear leg;

a front panel;

a rear panel;

a right support member connecting said right front leg and said right rear leg;

a left support member connecting said left front leg and said left rear leg;

a barbecue grill; and wherein said front legs and said rear legs each include an aperture, said front panel includes corresponding apertures for mating with said apertures in said right and said left front legs, said rear panel includes corresponding apertures for mating with said apertures in said right and said left rear legs, fastening means for securing said front panel to said right and said left front legs and said rear panel to said right and said left rear legs, and said barbecue grill is secured to said right and left support members.

* * * * *